CHANNEL SELECTING SWITCH WITH IMPROVED LOCKING MEANS

Filed Feb. 15, 1965 4 Sheets-Sheet 1

Inventors:
Raymond F. Lewandowski
William F. Boulter
Robert R. Gustafson
Harry S. Tice, Jr.
By Hofgren, Wegner,
Allen, Stellman & McCord Att'ys May 16, 1967 R. F. LEWANDOWSKI ET AL 3,320,372

CHANNEL SELECTING SWITCH WITH IMPROVED LOCKING MEANS

Filed Feb. 15, 1965 4 Sheets-Sheet 3

CHANNEL SELECTING SWITCH WITH IMPROVED LOCKING MEANS

Filed Feb. 15, 1965 4 Sheets-Sheet 4

3,320,372

CHANNEL SELECTING SWITCH WITH IMPROVED LOCKING MEANS

Raymond F. Lewandowski and William F. Boulter, Mount Prospect, and Robert R. Gustafson and Harry S. Tice, Jr., Crystal Lake, Ill., assignors to Oak Electro/Netics Corp., a corporation of Delaware Filed Feb. 15, 1965, Ser. No. 432,614
22 Claims. (Cl. 200—5)

The present invention relates to a selector switch having more than one mode of operation, and more particularly to a channel selector switch adapted for use in mobile telephones.

In a mobile telephone unit, it is desirable to provide a channel selector switch which is capable of operating in several different modes. For example, when a mobile telephone user is using the apparatus in a local service area, it is desirable to provide means which will enable him to receive and initiate calls automatically. Accordingly, when the receiver is lifted, means are provided for automatically receiving an idle channel, and for automatically identifying the mobile unit by a series of pulses. The IMTS (Improved Mobile Telephony Service) terminal determines from these pulses that the mobile unit is a local subscriber and sends back to him a dial tone. The mobile subscriber then dials his party in a normal way. This mode of operation will be referred to hereinafter as the "Home" mode. When the mobile telephone user is using his unit outside of the local service area, it is desirable to provide another mode of operation. This mode will hereinafter be referred to as the "Roam" mode. When one of the locally available channels has been selected and a call has been initiated, the mobile identification will not correspond to local I.D. codes, and the call will be automatically transferred to the local operator for handling. It is also desirable to provide a manual mode of operation when operating outside of the local service area, and this mode will be referred to hereinafter as the "Manual" mode. When this mode has been selected, the mobile telephone user merely lifts the hand set and depresses the push to talk button for a few seconds to reach the local mobile operator.

Accordingly, an object of the invention is to provide selecting switch means with means for selecting one of a plurality of modes of operation.

Another object of the invention is to provide channel selecting switch means with means for selecting one of a plurality of modes of operation in a single switch assembly.

A further object of the invention is to provide push button selector switch means with push button control switch means which are adapted to operate the selector switch means in one of a plurality of modes.

Still another object of the present invention is to provide mode selection means for a channel selector switch which is simple in construction and relatively inexpensive to manufacture and maintain.

These and other objects of the invention will hereinafter become more fully apparent from the following description taken in connection with the annexed drawings, wherein.

Figure 1:
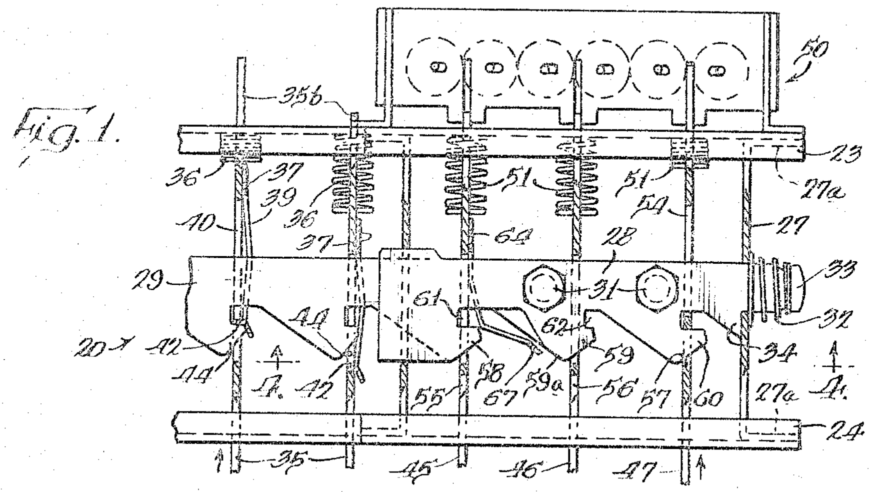
FIGURE 1 is a fragmentary plan view of a first embodiment of the invention, with certain parts broken away for clarity and showing the "manual" mode of operation.

While this invention is susceptible of embodiment in many different forms, there is shown in the drawings and will herein be described in detail only preferred embodiments, with the understanding that the present disclosure is to be considered as an exemplification of the principles of the invention and is not intended to limit the invention to the embodiments illustrated. The scope of the invention will be pointed out in the appended claims.

Figure 5:
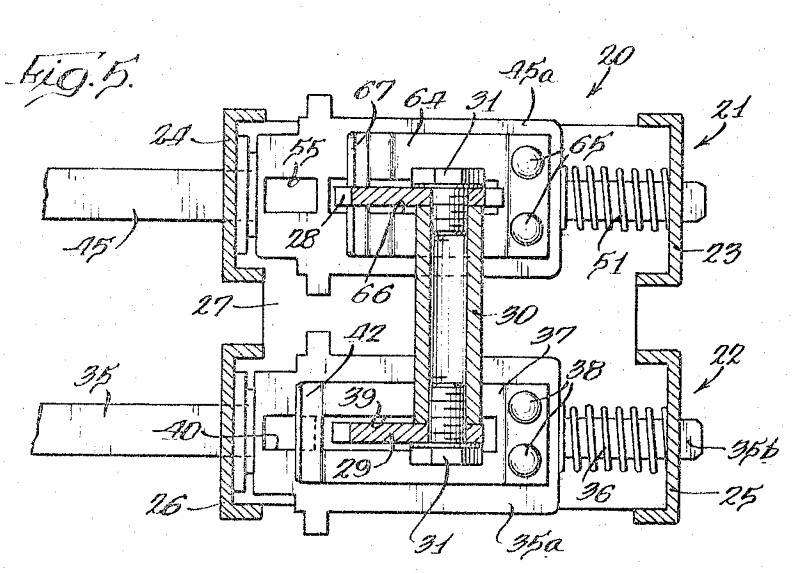
FIGURE 5 is a sectional view taken generally along line 5—5 of FIGURE 4.

Referring now to the drawings, the switch assembly 20 includes vertically spaced switch sections 21 and 22. The upper section 21 includes a pair of spaced, facing generally U-shaped channels 23 and 24, while the lower section 22 includes a pair of spaced, facing U-shaped channels 25 and 26. As can be best seen in FIGURE 5, a plurality of generally I-shaped support members 27 are fixed in channels 23–26 by any suitable means, such as by having their bent-over sides 27*a* riveted or otherwise secured to the channels.

A pair of longitudinally movable latch bars 28 and 29 are associated with switch sections 21 and 22, respectively. Latch bars 28 and 29 are coupled for movement together by a pair of hollow sleeves 30 which extend therebetween. The opposite ends of sleeves 30 are internally threaded, and are aligned with suitable apertures in latch bars 28 and 29. Screws 31 extend through the openings in the latch bars, and are threaded into the sleeves 30 to lock the latch bars 28 and 29 for movement together. A spring 32 is biased between an enlarged head 33 on latch bar 28 and the right hand support member 27, as viewed in FIGURE 1, to bias the latch bars 28 and 29 to the right. Latch bar 28 includes a suitable stop member 34, which is engageable with the right hand support 27 to limit the movement of the latch bars 28 and 29 to the right, as viewed in FIGURE 1.

Figure 4:
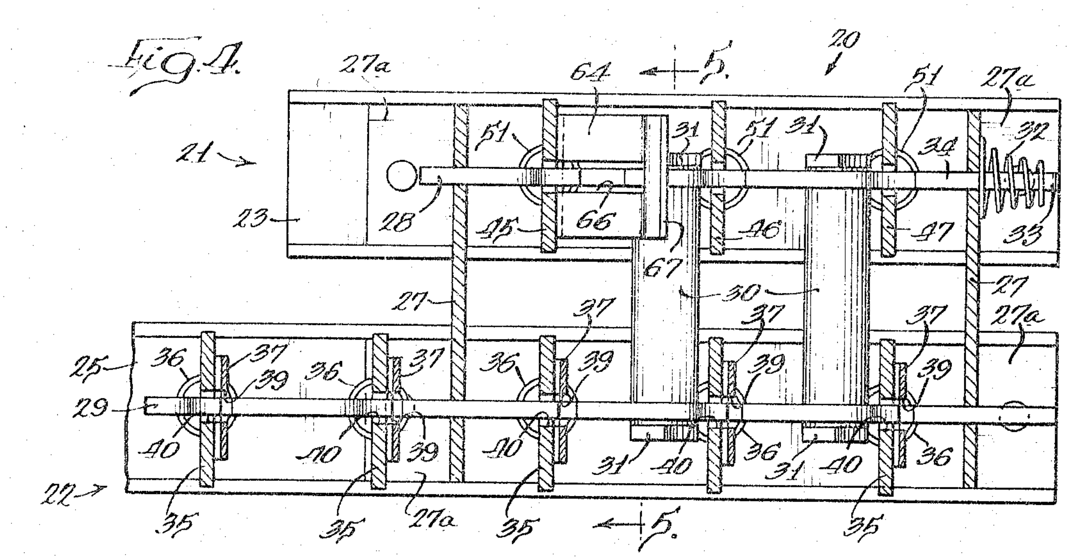
FIGURE 4 is an enlarged sectional view taken generally along line 4—4 of FIGURE 1.

A plurality of channel selector plungers 35 are slidably mounted in channels 25 and 26, and a spring 36 is biased between an enlarged portion 35*a* of each plunger 35 and the channel 25 to bias the members 35 to an "out" position. The rear end of a leaf spring 37 is fixed to the side of the enlarged portion 35*a* of each member 35, as by a pair of rivets 38. As can be best seen in FIGURE 4, each leaf spring 37, and each plunger 35, are provided with respective longitudinal slots 39 and 40 to accommodate longitudinal sliding movement of latch bar 29. The forward end of each leaf spring 37 is provided with a hook or tab 42, to define releasable means for engaging an adjacent abutment 44 on the latch bar 29 when the respective plunger 35 is pushed inwardly. As a plunger 35 is pushed inwardly, the latch bar 29 will be moved to the left until the tab 42 snaps into the recess 43 in the latch bar 29 behind the abutment 44 to lock the plunger 35 in the "in" position. It will be understood, of course, that the rearward ends 35*b* or projections 35*c* of the plungers 35 are adapted to engage suitable switching elements that are connected in appropriate circuits to effect the desired channel selection.

The upper switch section 21 is adapted to control the mode of operation of the lower channel selector switch section 22, and to this end three plungers 45–47 are provided which are slidably mounted in suitable aligned slots in channels 23 and 24. A block-out device 50 of known construction is provided on the rear face of channel 23, and allows only one of plungers 45–47 to be depressed at one time. Springs 51 are biased between channel 23 and enlarged plunger portions, such as shown at 45*a* in FIGURE 5 to bias the plungers 45–47 to an "out" position. Members 45–47 include respective longitudinal slots 52–54 to accommodate longitudinal sliding movement of the latch bar 28. Members 45–47 are also provided with respective windows 55–57 forwardly of slots 52–54, respectively, for a purpose to hereafter appear. Latch bar 28 is provided with three abutments 58–60 aligned respectively with plungers 45–47. Recesses 61–63 are provided behind abutments 58–60 respectively, and it will be understood that when one of the members 45–47 is depressed, the web between the slot and window will engage the respective latch abutment to move the latch 28 to the left until the abutment snaps into the window.

The rearward end of a leaf spring 64 is fixed to the side of plunger 45, as by rivets 65. Spring 64 is provided with a suitable longitudinal slot 66, to accommodate longitudinal sliding movement of latch bar 28. The forward end 67 of spring 64 is pressed outwardly into position for engagement with the adjacent side 59*a* of abutment 59, for a purpose to hereafter appear.

Figure 2:
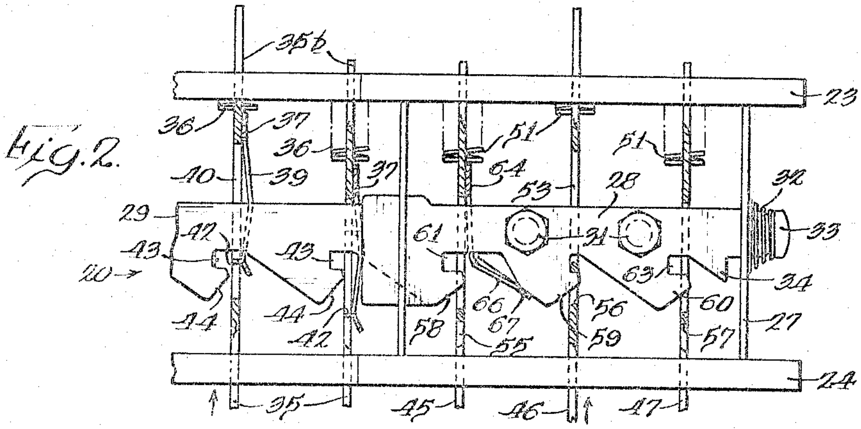
FIGURE 2 is a fragmentary plan view similar to FIGURE 1, but showing the "home" mode of operation.
Figure 3:
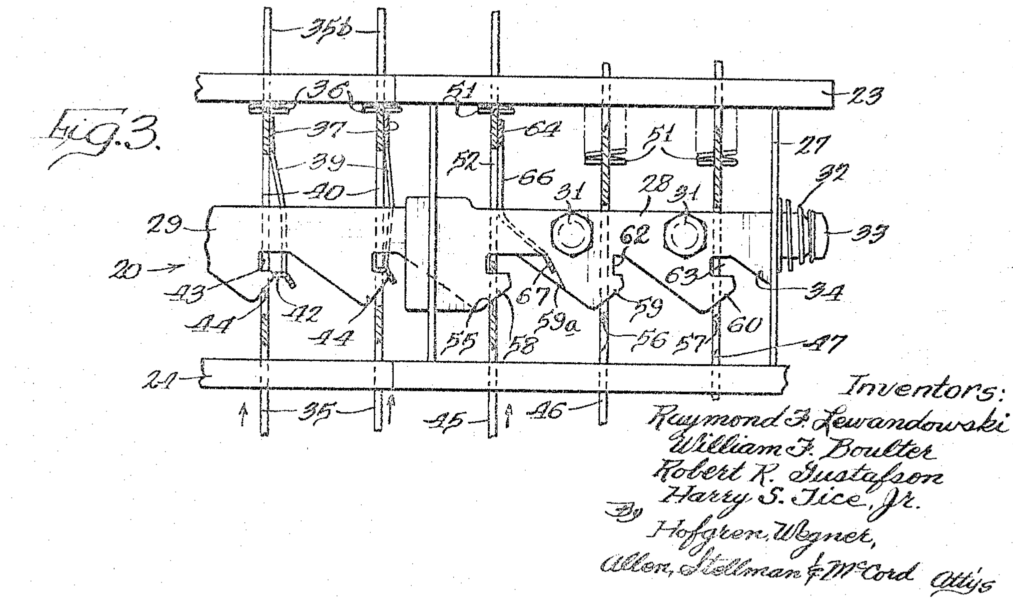
FIGURE 3 is a fragmentary plan view similar to FIGURES 1 and 2, and showing the "roam" mode of operation.

The plunger 46 corresponds to the "home" mode of operation, and it will be noted that the recess 62 is relatively shallow, so that when the plunger 46 is depressed, as seen in FIGURE 2, the latch bar 28 is shifted a relatively large amount to the left. When the "home" mode has been selected by depressing plunger 46, it will be noted that the latch bar 29 has been shifted to the left a sufficient amount to prevent the hooked portion 42 of the springs 37 from engaging the abutments 44, and thus there will be no latching of the plungers 35 in the "in" position. Springs 36 will function to return members 35 to the "out" position, so that the plungers are only momentarily in the "in" position during the "home" mode of operation.

Plunger 45 corresponds to the "roam" mode of operation, and when the plunger 45 is depressed, the end portion 67 of spring 64 moves into engagement with the adjacent portion 59*a* on the latch bar 28. Recess 61 is relatively deep, so that the latch bars 28 and 29 are not moved a large amount to the left, and the hooked portions 42 of springs 37 will latch with the recesses 43 in the latch bar 29 when the plungers 35 are depressed. Spring 64 is sufficiently strong to prevent any lateral movement of the latch bars 28 and 29 when the buttons 35 are depressed. Thus, it will be understood that when the "roam" mode of operation has been selected, each of the depressed plungers 35 will be latched in the "in" position, so that there is cumulative latching of the push buttons in the "roam" mode of operation.

When the "manual" mode of operation is selected by depressing plunger 47, the latch bars 28 and 29 are shifted to the left an amount substantially the same as that shown in connection with the "roam" mode of operation, since recesses 63 and 61 are of substantially the same depth. Springs 37 are substantially stronger than spring

32, so that when plungers 35 are depressed in the "manual" mode of operation, the latch bars 28 and 29 will be shifted to the left to release any of the plungers 35 which have been previously depressed. Thus, it will be apparent that in the "manual" mode of operation, only one channel selector plunger 35 will be latched in the "in" position at a given time.

Turning now to the embodiment illustrated in FIGURES 6 to 9, it will be noted that certain of the elements in this embodiment are substantially the same as, or identical to the elements illustrated in the embodiment of FIGURES 1 to 5. Accordingly, similar reference numerals have been used, with the numerals from the embodiment of FIGURES 1 to 5 having been increased by 100 for the embodiment of FIGURES 6 to 9.

In the embodiment of FIGURES 6 to 9, the latch bars 128 and 129 are locked for longitudinal movement together by a pair of sleeves 130. A third latch bar 170 is provided which is movable independently of latch bars 128 and 129, and which includes end portions 171 and 172, which are journaled in support members 127 to pivotally mount the latch bar 170. Latch bar 170 is provided with a central opening 173 to accommodate sleeves 130 and allow the latch bar 170 to pivot freely. A spring 174 is connected between a hook 176 at one end of the latch bar 170, and an inwardly struck tab 175 on the right hand support 127 to bias the latch bar 170 in a clockwise direction as viewed in FIGURES 7 to 9. An upwardly extending retaining member in the form of a finger 175 is provided at the left hand side of latch bar 170, and is adapted to extend upwardly through a slot 176 in the latch bar 128 during the "roam" mode of operation, as will hereinafter become more fully apparent. The forward edge 177 of latch bar 170 is inclined downwardly, and a recessed notch 178 is provided inwardly of the inclined portion 177. Plungers 145–147 each include respective downwardly extending fingers 179–181, which are adapted to engage the inclined portion 177 of the latch bar 170 as the plungers are depressed, to pivot the latch bar 170 in a counterclockwise direction as viewed in FIGURES 7 to 9. As the plungers 145–147 complete their inward travel, the fingers 179–181 will snap into the recess 178 to lock the plungers in the "in" position. A conventional block-out device, such as that shown at 50 in FIGURE 1, may be provided in connection with the upper switch section 121, to prevent the latching of more than one of plungers 145–147 at one time.

Figures 6, 7, 8, 9:
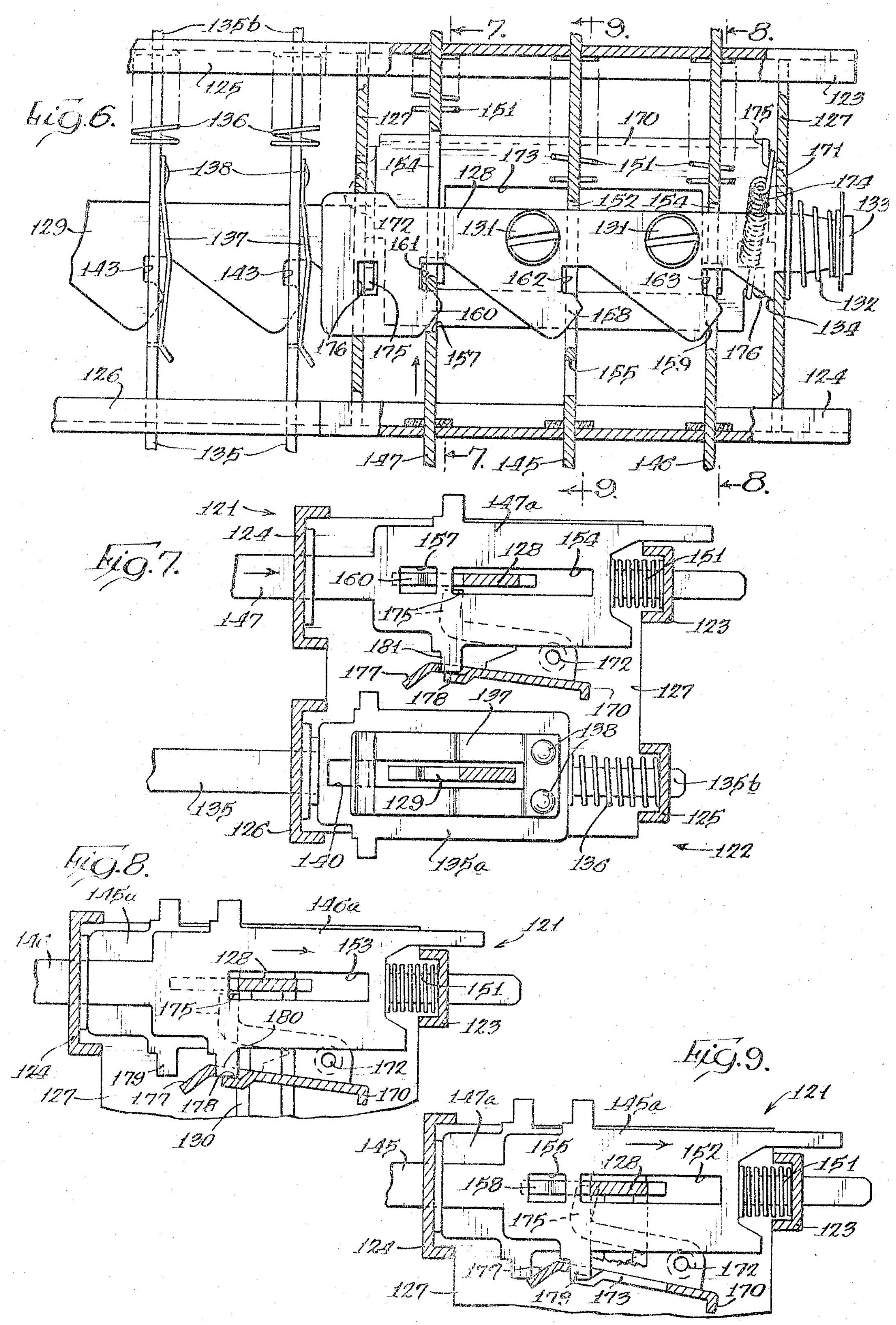
FIGURE 6 is a fragmentary plan view showing a second embodiment of the invention, with certain parts being broken away for clarity of illustration, and showing the "manual" mode of operation.
FIGURE 7 is a sectional view taken generally along line 7—7 of FIGURE 6.
FIGURE 8 is a fragmentary sectional view taken generally along line 8—8 of FIGURE 6, and illustrating the "home" mode of operation.
FIGURE 9 is a fragmentary sectional view taken generally along line 9—9 of FIGURE 6, and showing the "roam" mode of operation.
Figure 10:
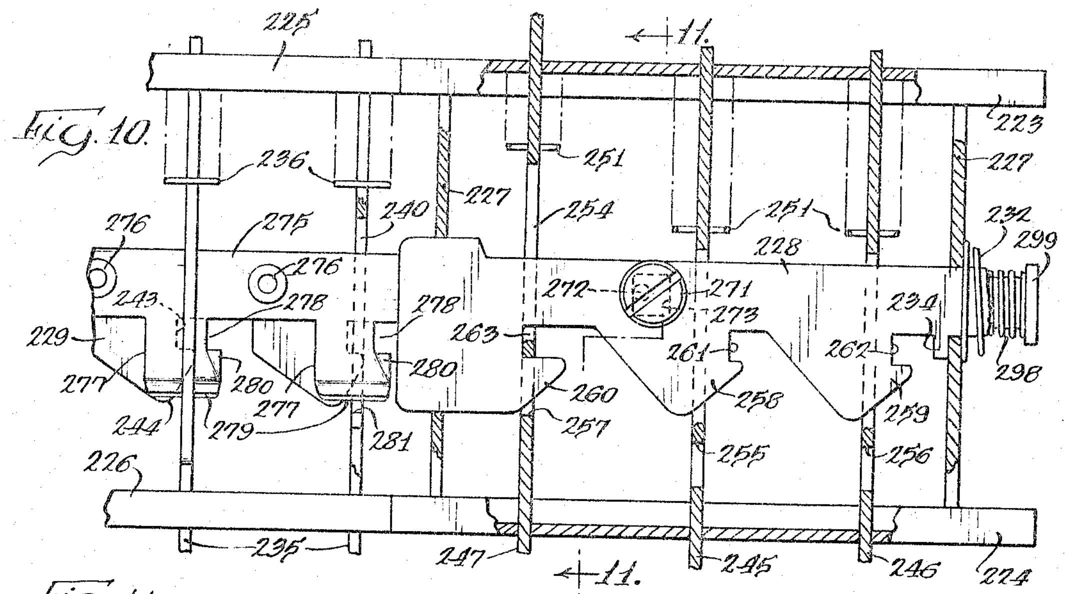
FIGURE 10 is a fragmentary plan view of a third embodiment of the invention, with certain parts being broken away for clarity of illustration, and showing the "manual" mode of operation.
Figure 11:
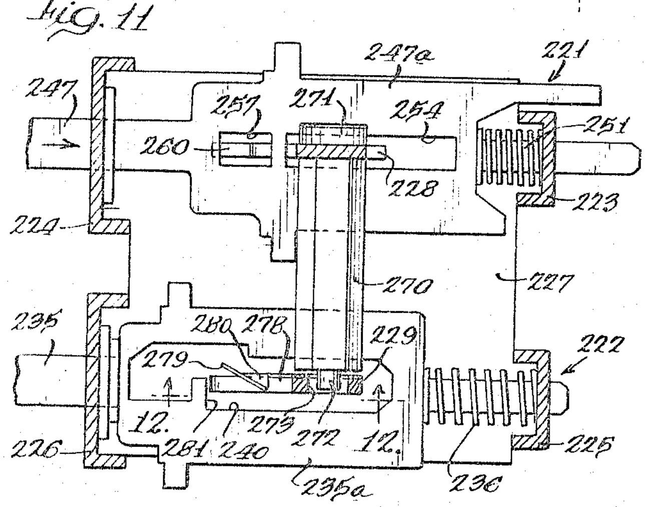
FIGURE 11 is a sectional view taken generally along line 11—11 of FIGURE 10.
Figure 12:
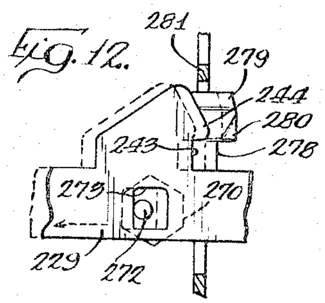
FIGURE 12 is a fragmentary bottom plan view taken generally along line 12—12 in FIGURE 11.
Figure 13:
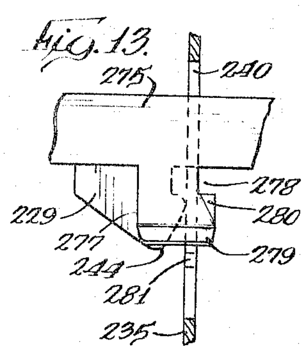
FIGURE 13 is a top plan view similar to FIGURE 12 but showing the "home" mode of operation.
Figure 14:
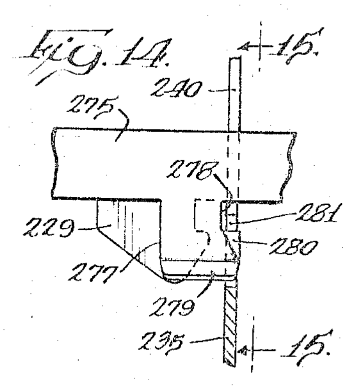
FIGURE 14 is a top view similar to FIGURES 12 and 13, but showing the "roam" mode of operation.
Figure 15:
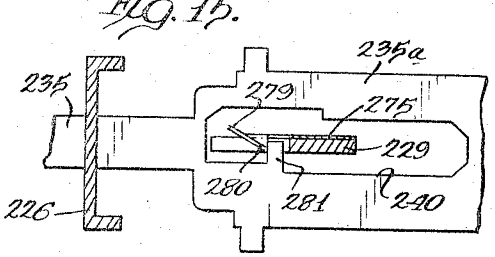
FIGURE 15 is a view taken generally along line 15—15 of FIGURE 14.

In order to select the "home" mode of operation, the plunger 146 is depressed, as can be best seen in FIGURE 8. From FIGURE 8 it will be noted that no window is provided in the plunger 146 ahead of slot 153, so that when the plunger 146 is depressed, the latch bars 128 and 129 will be shifted a relatively large amount to the left. Abutment 159 is sufficiently large that its engagement with the side of plunger 146 will shift the latch bars 128 and 129 a sufficient amount that the springs 137 on the channel selector plungers 135 will not engage the recesses 143 when the plungers 135 are depressed. In this manner, it will be readily appreciated that when the "home" mode of operation has been selected there will be no latching of the plungers 35 in the "in" position, and they will be momentarily actuated.

In order to select the "roam" mode of operation, the plunger 145 is depressed, as can be best seen in FIGURE 9. It will be understood that as the plunger 145 is depressed, its downwardly extending portion 179 will engage the inclined portion 177 of the latch bar 170 to pivot it in a counterclockwise direction, as viewed in FIGURE 9, to release the latch bar 170 from its latching engagement with whichever of the plungers 147 or 146 has been previously depressed. When the button 145 is latched in the "in" position, abutment 158 extends through window 155, to locate the recesses 143 in latch bar 129 in position for engagement with the springs 137 on the plungers 135. From an examination of FIGURE 9, it will be clear that when the plunger 145 has been depressed, the finger 175 is free to move upwardly into engagement with the slot 176 under the urging of spring 174 because of the opening 173 in the latch bar 170. The engagement of finger 175 with slot 176 effectively locks latch bars 128 and 129 against longitudinal movement, so that when the plungers 135 are depressed they will be accumulatively latched in the "in" position.

In order to select the "manual" mode of operation, plunger 147 is depressed, as can be seen in FIGURES 6 and 7. In this mode the abutment 160 on the latch bar 128 extends through the window 157 in the plunger 147 so that the recesses 143 in latch bar 129 are positioned for latching engagement with the springs 137 on the plungers 135. It will be understood, of course, that as the plunger 147 is depressed, and its downwardly extending finger 181 engages the inclined portion 177 of latch bar 170 to pivot the latch bar 170 in a counterclockwise direction, as viewed in FIGURE 7, and release whichever of plungers 145 and 146 have been previously depressed. As can be seen in FIGURE 7, the top of recess 178 engages the bottom of finger 181, so that the finger 175 is prevented from moving upwardly into engagement with the slot 176. Thus, in the "manual" mode of operation, the latch bars 128 and 129 are free to move longitudinally of the switch assembly, and since the springs 137 are substantially stronger than the spring 132, the depressing of one plunger 135 will normally release whichever of the plungers 135 have been previously depressed.

Turning now to the embodiment of FIGURES 10 to 15, elements therein which are substantially the same as, or identical with, corresponding elements in the embodiment of FIGURES 1 to 5, are identified with reference numerals increased by 200.

In the embodiment of FIGURES 10 to 15, the means for coupling the latch bars 228 and 229 for movement together include a sleeve 270 which extends therebetween. The upper end of sleeve 270 is fixed to latch bar 228 by a suitable screw 271, and the lower end of sleeve 270 is provided with an eccentric stud 272. Stud 272 is received within a rectangular slot 273 in the latch bar 229, and provides a means for adjusting the position of latch bar 228 relative to 229. Stud 272 is held against the side of slot 273 by spring 298 which is biased between the enlarged end 299 of latch bar 229 and the right hand support 227, and thus the latch bars 228 and 229 are coupled for longitudinal movement together. A flat spring 275 is fixed on the upper surface of latch bar 229 as by rivets 276, and extends substantially from end to end thereof. Spring 275 includes a plurality of forwardly extending spring portions or abutment members 277, which are adapted to overlie abutments 244 and recesses 243 in the latch bar 229. Spring portions 277 each include a notch 278 in the right hand side thereof, an upwardly inclined forward portion 279, and a downwardly bent tab or detent 280 adjacent recess 278. Each plunger 235 includes a latching finger 281 extending upwardly into slot 240, and which cooperates with the latch bar 229 and the spring 275 in a manner to be hereafter described in connection with the various modes of operation.

When plunger 246 has been depressed to select the "home" mode of operation, the abutment 259 on the latch bar 228 will extend through the window 256 in the plunger 246. Since the recess 262 in the latch bar 228 is relatively shallow, the latch bars 228 and 229 will be moved a substantial distance to the left, such as that shown in FIGURE 13. In this position, it will be noted that when the channel selecting plungers 235 are depressed, the arms 281 will pass under the spring portions 277 and miss the abutment 244 on the latch bar 229 as well as the tab 280 on the spring 275. Thus, it will be apparent that in the "home" mode of operation the plungers 235 are momentarily actuated, or spring returned.

When the "roam" mode of operation has been selected by depressing plunger 245, the abutment 258 on latch bar 228 will extend through the window 255 in the plunger 245. Since the recess 261 is slightly shallower than the recess 262, the latch bars 228 and 229 will be shifted slightly farther to the left as viewed in FIGURE 14, to align tab 280 with the plungers 235. Thus, as plungers 235 are depressed, arms 281 will snap under tabs 280 to cumulatively lock each of the plungers 235 in the "in" position.

When the "manual" mode of operation has been selected by depressing plunger 247, the abutment 260 on latch bar 228 will pass through the window 257 in the plunger 247. Since the recess 263 in the latch bar 228 is deeper than the recess 262, the latch bars 228 and 229 will be shifted only a slight amount to the left, such as that shown in FIGURE 12, so as to position the arms 281 on the plungers 235 in alignment with the abutments 244 and the recesses 243 in the latch bar 229. Thus, when one plunger 235 is depressed, the arm 281 on the plunger 235 will pass under the spring portion 277 and the recess 243 in the latch bar 229. When a second plunger 235 is depressed, arm 281 will engage the abutment 244 to shift the latch bar 229 to free the previously depressed latch bars for movement to an "out" position.

We claim:

1. A switch assembly comprising: a channel selecting switch section including a plurality of selectively actuatable channel selecting members; a control push button switch section for controlling the mode of operation of said channel selecting switch members; said control push button switch section having a first reciprocable plunger and means cooperable therewith for operating said members in a first or momentary mode wherein the application of an actuating force to one of said members actuates said member, and the removal of said actuating force discontinues the actuation of said member; said control push button switch section having a second reciprocable plunger and means cooperable therewith for operating said members in a second or cumulative mode wherein the application of an actuating force to one of said members actuates said member, the removal of said actuating force does not discontinue the actuation of said member, and the application of an actuating force to another of said members actuates the same and does not discontinue the actuation of the previously actuated member; and said control push button switch section having a third reciprocable plunger and means cooperable therewith for operating said members in a third or interlocking mode wherein application of an actuating force to one of said members actuates said member, the removal of said actuating force does not discontinue the actuation of said member, and the application of an actuating force to another of said members actuates the same and discontinues the actuation of the first actuated member.

2. A switch assembly comprising: a frame; selector switch means on said frame including a plurality of individually movable switching members, each member being movable to a position for selecting one of a plurality of channels, said switch members each being operable in several different modes for selecting said channels; a control means on said frame for controlling the mode of operation of said selector switch members and including, a control latch bar having a latching member for each selector switch mode, means mounting said latch bar for movement longitudinally of said frame, control plunger for each selector switch mode, means mounting each control plunger for reciprocating movement on said frame, each control plunger having means for releasably engaging one of said latching members to move said latch bar longitudinally of said frame and latch the respective control plunger in an "in" position, and means responsive to movement of different ones of said control plungers to said "in" position for operating said selector switch members in said different modes.

3. A switch assembly comprising: a frame; a first push button switch section on said frame, said first switch section including a plurality of selectively operable members movable relative to said frame; a second push button switch section on said frame and associated with said first switch section, said second switch section including a plurality of members movable relative to said frame; and means responsive to movement of each of the members of said second switch section for operating the members of said first switch section in a different mode.

4. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position; a control switch section including a latch bar having latching means; means securing said channel selecting latch bar to said control latch bar for longitudinal movement together; a plurality of control plungers reciprocally mounted on said frame and each having releasable means for engaging said control latching means to move said latch bars longitudinally of said frame and latch the control plungers in an "in" position; and means responsive to movement of each control plunger to said "in" position for operating said channel selecting plungers in a different mode.

5. A switch assembly as defined in claim 4, wherein means are provided for adjusting the position of said channel selecting section latch bar relative to said control section latch bar.

6. A switch assembly as defined in claim 4 wherein means are provided for preventing simultaneous actuation of more than one of said control plungers to the "in" position.

7. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position; a control switch section including a latch bar with a plurality of latching members; means securing said channel selecting latch bar to said control latch bar for longitudinal movement together; a plurality of control plungers reciprocally mounted on said frame and each having releasable means for engaging one of said control latching members to move said latch bars longitudinally of said frame and latch the control plungers in an "in" position, means associated with one of said control plungers for operating said channel selecting plungers in a first or momentary mode wherein no latching of said channel selecting plungers in the "in" position takes place when the channel selector plungers are depressed and released, means associated with a second control plunger for operating said channel selecting plungers in a second or cumulative mode wherein each of said channel selector members is latched in the "in" position when the channel selector plungers are depressed and released, and means associated with a third control plunger for operating said channel selecting plungers in a third or interlocking mode wherein only one of said channel selecting plungers can be latched in the "in" position at a given time.

8. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position; a control switch section including a latch bar with a plurality of latching members; means securing said channel selecting latch bar to said control latch bar for longitudinal movement together; resilient means biasing said latch bars in one direction on said frame; a plurality of control plungers reciprocally mounted on said frame and each having releasable means for engaging one of said control latching members to move said latch bars longitudinally of said frame against the bias of said resilient means and latch the control plungers in an "in" position; means associated with one of said control plungers for moving said latch bars a sufficient amount to prevent the engagement of the releasable means of the channel selecting plungers with the latching members of the channel selecting latch bar when said one control plunger is mover to the "in" position, to operate said channel selecting plungers in a first or momentary mode wherein no latching of said channel selecting plungers in the "in" position takes place when the channel selector plungers are depressed and released; means associated with a second control plunger for moving the latching members of the channel selecting latch bar into alignment with the releasable means of the channel selecting plungers, and for holding the latch bars against movement when said second control plunger is moved to the "in" position, to operate said channel selecting plungers in a second or cumulative mode wherein each of said channel selector members is latched in the "in" position when the channel selector plungers are depressed and released; and means associated with a third control plunger for moving the latching members of the channel selecting latch bar into alignment with the releasable means of the channel selecting plungers when the third control plunger is moved to the "in" position, to operate said channel selecting plungers in a third or interlocking mode wherein movement of one of said channel selecting plungers to the "in" position moves said latch bars to release previously latched control plungers, and only one of said control plungers is latched in the "in" position at a given time.

9. A switch assembly comprising: a frame; a channel selecting switch section including, a latch bar mounted for longitudinal movement on said frame and having a plurality of latching members, a plurality of channel selecting plungers reciprocally mounted on said frame and each having an aperture therethrough slidably receiving said latch bar, each plunger having releasable means for engaging one of said latching members to move said latch bar longitudinally of said frame and latch said plungers in an "in" position, first resilient means biasing said plungers toward an "out" position; a control switch section including a latch bar with a plurality of latching members; means securing said channel selecting latch bar to said control latch bar for longitudinal movement together; second resilient means biasing said latch bars in one direction on said frame; a plurality of control plungers reciprocally mounted on said frame and each having an aperature therethrough slidably receiving said control latch bar, each control plunger having releasable means for engaging one of said control latching members to move said latch bars longitudinally of said frame against the bias of said second resilient means and latch the control plungers in an "in" position; third resilient means associated with one of said control plungers toward an "out" position; means associated with one of said control plungers for moving said latch bars a sufficient amount to prevent the engagement of the releasable means of the channel selecting plungers with the latching members of the channel selecting latch bar when said one control plunger is moved to the "in" position, to operate said channel selecting plungers in a first or momentary mode wherein no latching of said channel selecting plungers in the "in" position takes place when the channel selector plungers are depressed and released; means associated with a second control plunger for moving the latching members of the channel selecting latch bar into alignment with the releasable means of the channel selecting plungers, and for holding the latch bars against movement when said second control plunger is moved to the "in" position, to operate said channel selecting plungers in a second or cumulative mode wherein each of said channel selector members is latched in the "in" position when the channel selector plungers are depressed and released; and means associated with a third control plunger for moving the latching members of the channel selecting latch bar into alignment with the releasable means of the control selecting plungers when the third control plunger is moved to the "in" position, to operate said channel selecting plungers in a third or interlocking mode wherein movement of one of said channel selecting plungers to the "in" position moves said latch bars to release previously latched control plungers, and only one of said control plungers is latched in the "in" position at a given time.

10. A switch assembly as defined in claim 9 in which the releasable means of said channel selecting plungers is a flat spring for each channel selecting plunger, each spring being fixed at one end to a channel selecting plunger and having a free end for engaging a latching member of the channel selecting latch bar.

11. A switch assembly as defined in claim 10 wherein said flat spring is stronger than said second resilient means.

12. A switch assembly comprising: a frame, a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position; a control switch section including a latch bar with a plurality of latching members, said control latch bar having a recess adjacent each of said latching members; means securing said channel selecting latch bar to said control latch bar for longitudinal movement together; resilient means biasing said latch bars in one direction on said frame; a plurality of control plungers reciprocally mounted on said frame and each having releasable means for engaging one of said control latching members to move said latch bars longitudinally of said frame against the bias of said resilient means, the releasable means of said control plungers being receivable in one of said recesses to latch the control plungers in an "in" position; a first of said recesses being relatively shallow so that said latch bars are moved a sufficient amount to prevent the engagement of the releasable means of the channel selecting plungers with the latching members of the channel selecting latch bar when a first of said control plungers is moved to the "in" position, to operate said channel selecting plungers in a first or momentary mode wherein no latching of said channel selecting plungers in the "in" position takes place when the channel selector plungers are depressed and released; a second of said recesses being deeper than said first recess to move the latching members of the channel selecting latch bar into alignment with the releasable means of the channel selecting plungers when a second of said control plungers is moved to the "in" position, means on said second control plunger for holding said latch bars against movement when said second plunger is moved into the "in" position, whereby said channel selecting plungers are operated in a second or cumulative mode wherein each of said channel selector members is latched in the "in" position when the channel selector plungers are depressed and released; and a third of said recesses being of substantially the same depth as said second recess to move the latching members of the channel selecting latch bar into alignment with the releasable means of the channel selecting plungers when the third control plunger is moved to the "in" position, to operate said channel selecting plungers in a third or interlocking mode wherein movement of one of said channel selecting plungers to the "in" position moves said latch bars to release previously latched control plungers, and only one of said control plungers is latched in the "in" position at a given time.

13. A switch assembly as defined in claim 12 wherein said means for holding said latch bars against movement includes a flat spring fixed to said second control plunger and having an outwardly extending portion movable into engagement with said channel selecting latch bar when said second control plunger is moved into the "in" position.

14. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position, first resilient means biasing each of said plungers toward an "out" position; a control switch section including a first control latch bar pivotally mounted on said frame and having a latching means, and a second apertured control latch bar secured to said channel selecting latch bar for longitudinal movement together; a retaining member on said first control latch bar adapted to engage an aperture of said second control latch bar to prevent longitudinal movement thereof; a plurality of abuttable members on said second control latch bar; a plurality of control plungers reciprocally mounted on said frame, each having first means for engaging one of said abuttable members to move said selecting latch bar and said control latch bar longitudinally of said frame against the bias of said second resilient means, and second means for engaging the latching means of said first control latch bar to latch the control plungers in an "in" position; third resilient means biasing each of said control plungers toward an "out" position; means associated with one of said control plungers for moving said selecting latch bar and said second control latch bar a sufficient amount to prevent the engagement of the releasable means of the channel selector plunger with the latching members of the selecting latch bar when said one control plunger is moved to the "in" position, to operate said channel selecting plungers in a first or momentary mode wherein no latching of said channel selecting plungers in the "in" position takes place when the channel selector plungers are depressed and released; means associated with a second control plunger for moving the latching members of the selecting latch bar into alignment with the releasable means of the channel selecting plungers, and for moving said retaining member into said aperture to hold said selecting latch bar and said second control latch bar against movement when said second control plunger is depressed, to operate said channel selecting plungers in a second or cumulative mode wherein each of said channel selector members is latched in the "in" position when the channel selector plungers are depressed and released; and means associated with a third control plunger for moving the latching members of the selecting latch bar into alignment with the releasable means of the channel selecting plungers when said third control plunger is moved to the "in" position, to operate said channel selecting plungers in a third or interlocking mode wherein movement of one of said channel selecting plungers to the "in" position moves said selecting latch bar and said second control latch bar to release previously depressed channel selecting plungers so that only one of said channel selecting plungers can be latched in the "in" position at a given time.

15. A switch assembly comprising: a frame; a chanel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position, first resilient means biasing each of said plungers toward an "out" position; a control switch section including a first control latch bar pivotally mounted on said frame and having latching means, and a second apertured control latch bar secured to said channel selecting latch bar for longitudinal movement together; a retaining member on said first control latch bar adapted to engage an aperture of said second control latch bar to prevent longitudinal movement thereof; spring means urging said retaining member toward said second control latch bar; a plurality of abuttable members on said second control latch bar; a plurality of control plungers reciprocally mounted on said frame, each having first means for engaging one of said abuttable members to move said selecting latch bar and said second control latch bar longitudinally of said frame against the bias of said second resilient means, and second means for engaging the latching means of said first control latch bar to latch the control plungers in an "in" position; third resilient means biasing each of said control plungers toward an "out" position; means associated with one of said control plungers for moving said selecting latch bar and said second control latch bar a sufficient amount to prevent the engagement of the releasable means of the channel selector plunger with the latching members of the selecting latch bar and to move a non-apertured portion of said second control latch bar into alignment with said retaining member when said one control plunger is moved to the "in" position, to operate said channel selecting plungers in a first or momentary mode wherein no latching of said channel selecting plungers in the "in" position takes place when the channel selector plungers are depressed and released; means asociated with a second control plunger for moving the latching members of the selecting latch bar into alignment with the releasable means of the channel selecting plungers, and for moving an apertured portion of said second control latch bar into alignment with said retaining member so that said spring means urges said retaining member into said aperture to hold said selecting latch bar and said second control latch bar against movement when said second control plunger is depressed, to operate said channel selecting plungers in a second or cumulative mode wherein each of said channel selector members is latched in the "in" position when the channel selector plungers are depressed and released; and means associated with a third control plunger for moving the latching members of the selecting latch bar into alignment with the releasable means of the channel selecting plungers and to move a non-apertured portion of said second control latch bar into alignment with said retaining member when said third control plunger is moved to the "in" position, to operate said chanel selecting plungers in a third or interlocking mode wherein movement of one of said channel selecting plungers to the "in" position moves said selecting latch bar and said second control latch bar to release previously depressed channel selecting plungers so that only one of said channel selecting plungers can be latched in the "in" position at a given time.

16. A switch assembly as defined in claim 15 in which said first control latch bar includes an inclined surface, and wherein each of said control plungers includes a portion engageable with said inclined surface when said control plungers are moved toward the "in" position to pivot said first control latch bar and release any previously latched control plungers.

17. A switch assembly as defined in claim 16 wherein the latching means of said first control latch bar is defined by a recess adjacent said inclined surface.

18. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position, first resilient means biasing each of said plungers toward an "out" position, yieldable abutment members on said latch bar in general alignment with said latching members, each of said abutment members having a detent offset from said latching member for engaging the releasable means of a plunger when the plunger is moved into the "in" position, said abutment members each also having a clearance portion between said detent and said latching member wherein said plungers can be moved into and out of the "in" position without latching in the "in" position; a control switch section including a latch bar with a plurality of latching members; means securing said channel selecting latch bar to said control latch bar for longitudinal movement together; second resilient means biasing said latch bars in one direction on said frame; a plurality of control plungers reciprocally mounted on said frame and each having releasable means for engaging one of said control latching members to move said latch bars longitudinally of said frame against the bias of said second resilient means and latch said control plungers in an "in" position; third resilient means biasing each of said control plungers toward an "out" position; means associated with one of said control plungers for moving the clearance portion of said abutment members into alignment with the releasable means of the channel selecting plungers when said one control plunger is moved to the "in" position to operate said channel selecting plungers in a first or momentary mode wherein no latching of said channel selecting plungers in the "in" position takes place when the channel selector plungers are depressed and released; means associated with a second control plunger for moving the detents of said abutment members into alignment with the releasable means of the channel selecting plungers when said second control plunger is moved to the "in" position to operate said channel selecting plungers in a second or cumulative mode wherein each of said channel selector members is latched in the "in" position when the channel selector plungers are depressed and released; and means associated with a third control plunger for moving said channel selecting latch bar latching members into alignment with the releasable means of the channel selecting plungers when said third control plunger is moved into the "in" position to operate said channel selecting plungers in a third or interlocking mode wherein movement of one channel selecting plunger into the "in" position moves said latch bar to release previously depressed channel selecting plungers so that only one of said channel selecting plungers can be latched in the "in" position at a given time.

19. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position, first resilient means biasing each of said plungers toward an "out" position, a flat spring fixed on said latch bar and having a plurality of yieldable abutment members each abutment member being positioned in general alignment with one of said latching members, each of said abutment members having a detent offset from said latching member for engaging the releasable means of a plunger when the plunger is moved into the "in" position, said abutment members each also having a clearance portion between said detent and said latching member whereby said plungers can be moved into and out of the "in" position without latching in the "in" position; a control switch section including a latch bar with a plurality of latching members; means securing said channel selecting latch bar to said control latch bar for longitudinal movement together; second resilient means biasing said latch bars in one direction on said frame; a plurality of control plungers reciprocally mounted on said frame and each having releasable means for engaging one of said control latching members to move said latch bars longitudinally of said frame against the bias of said second resilient means and latch said control plungers in an "in" position; third resilient means biasing each of said control plungers toward an "out" position; means associated with one of said control plungers for moving the clearance portion of said abutment members into alignment with the releasable means of the channel selecting plungers when said one control plunger is moved to the "in" position to operate said channel selecting plungers in a first or momentary mode wherein no latching of said channel selecting plungers in the "in" position takes place when the channel selector plungers are depressed and released; means associated with a second control plunger for moving the detents of said abutment members into alignment with the releasable means of the channel selecting plungers when said second control plunger is moved to the "in" position to operate said channel selecting plungers in a second or cumulative mode wherein each of said channel selector members is latched in the "in" position when the channel selector plungers are depressed and released; and means associated with a third control plunger for moving said channel selecting latch bar latching members into alignment with the releasable means of the channel selecting plungers when said third control plunger is moved into the "in" position to operate said channel selecting plungers in a third or interlocking mode wherein movement of one channel selecting plunger into the "in" position moves said latch bar to release previously depressed channel selecting plungers so that only one of said channel selecting plungers can be latched in the "in" position at a given time.

20. A switch assembly as defined in claim 19 in which each of said channel selecting plungers is provided with a longitudinal slot, and wherein a transverse arm is provided on each plunger extending partially across said slot; said control latch bar and said flat spring being received in said slots, and each of said abutments having an inclined forward portion adapted to be engaged by the transverse arm on the respective channel selecting plunger.

21. A switch assembly as defined in claim 20 wherein each detent is inclined oppositely to said inclined forward edge.

22. A switch assembly comprising: a frame; a channel selecting switch section including, a latch bar mounted for longitudinal movement on said frame and having a plurality of latching members, a plurality of channel selecting plungers reciprocally mounted on said frame and each having releasable means for engaging one of said latching members to move said latch bar longitudinally of said frame and latch said plungers in an "in" position, first resilient means biasing each of said plungers toward an "out" position, yieldable abutment members on said latch bar in general alignment with said latching members, each of said abutment members having a detent offset from said latching member for engaging the releasable means of a plunger when the plunger is moved into the "in" position, said abutment members each also having a clearance portion between said detent and said latching members whereby said plungers can be moved into and out of the "in" position without latching in the "in" position; a control switch section including a latch bar with a plurality of latching members, said control latch bar having a recess adjacent each of said latching members; means securing said channel selecting latch bar to said control latch bar for longitudinal movement together; second resilient means biasing said latch bars in one direction on said frame; a plurality of control plungers reciprocally mounted on said frame and each having releasable means for engaging one of said control latching members to move said latch bars longitudinally of said frame against the bias of said second resilient means, the releasable means of said control plungers being receivable in one of said recesses to latch said control plungers in an "in" position; third resilient means biasing said control plungers toward an "out" position; a first of said recesses being sufficiently deep to move the clearance portion of said abutment members into alignment with the releasable means of the channel selecting plungers when a first control plunger is moved to the "in" position, to operate said channel selecting plungers in a first or momentary mode wherein no latching of said channel selecting plungers in the "in" position takes place when the channel selector plungers are depressed and released; a second of said recesses being shallower than said first recess to move the detents of said abutment members into alignment with the releasable means of the channel selecting plungers when a second control plunger is moved to the "in" position to operate said channel selecting plungers in a second or cumulative mode wherein each of said channel selector members is latched in the "in" position when the channel selector plungers are depressed and released; and a third of said recesses being deeper than said first recess to move said channel selecting latch bar latching members into alignment with the releasable means of the channel selecting plungers when a third control plunger is moved into the "in" position to operate said channel selecting plungers in a third or interlocking mode wherein movement of one channel selecting plunger into the "in" position moves said latch bar to release previously depressed channel selecting plungers so that only one of said channel selecting plungers can be latched in the "in" position at a given time.

References Cited by the Examiner

UNITED STATES PATENTS

| | | | |
|---|---|---|---|
| 2,196,433 | 4/1940 | Allison | 200—5 |
| 2,213,845 | 9/1940 | Mastney et al. | 200—5 |
| 2,831,075 | 4/1958 | Dumke et al. | 200—5 X |
| 2,921,159 | 1/1960 | Elderton et al. | 200—159 X |
| 3,142,198 | 7/1964 | Williams | 200—5 |

ROBERT K. SCHAEFER, *Primary Examiner.*

J. R. SCOTT, *Assistant Examiner.*